(12) United States Patent
Wallace-Morrison

(10) Patent No.: US 11,198,506 B2
(45) Date of Patent: Dec. 14, 2021

(54) AIRCRAFT WITH VERSATILE AVIATION

(71) Applicant: Copeland Wallace-Morrison, Plainfield, NJ (US)

(72) Inventor: Copeland Wallace-Morrison, Plainfield, NJ (US)

( * ) Notice: Subject to any disclaimer, the term of this patent is extended or adjusted under 35 U.S.C. 154(b) by 214 days.

(21) Appl. No.: 16/533,608

(22) Filed: Aug. 6, 2019

(65) Prior Publication Data
US 2021/0039778 A1 Feb. 11, 2021

(51) Int. Cl.
| | | |
|---|---|---|
| *B64C 31/036* | (2006.01) | |
| *B64C 11/00* | (2006.01) | |
| *B64C 3/56* | (2006.01) | |
| *B64C 39/06* | (2006.01) | |
| *B64C 21/02* | (2006.01) | |
| *B64C 29/00* | (2006.01) | |

(52) U.S. Cl.
CPC ............ *B64C 31/036* (2013.01); *B64C 3/56* (2013.01); *B64C 11/001* (2013.01); *B64C 21/02* (2013.01); *B64C 29/0025* (2013.01); *B64C 39/062* (2013.01)

(58) Field of Classification Search
CPC ....... B64C 31/036; B64C 11/001; B64C 3/56; B64C 39/062; B64C 21/02; B64C 29/0025; B64D 17/80
See application file for complete search history.

(56) References Cited

U.S. PATENT DOCUMENTS

| | | | | |
|---|---|---|---|---|
| 1,877,902 | A * | 9/1932 | Kuethe | ..................... B64C 5/16 244/6 |
| 2,036,011 | A * | 3/1936 | Barrett | .................. B64C 27/021 244/39 |
| 3,253,805 | A * | 5/1966 | Taylor | ..................... B64C 39/06 244/12.2 |
| D232,183 | S * | 7/1974 | Reed | ........................... D21/442 |
| 3,933,325 | A * | 1/1976 | Kaelin | .................. B64C 39/001 244/23 C |
| 4,301,981 | A * | 11/1981 | Hartt | ....................... B64C 27/32 244/12.2 |
| 4,913,376 | A * | 4/1990 | Black | ...................... B64C 27/02 244/17.11 |
| D333,650 | S * | 3/1993 | Wallace-Morrison | ....... D12/326 |
| 5,190,242 | A * | 3/1993 | Nichols | ................... A63H 27/12 244/12.2 |
| 5,503,351 | A * | 4/1996 | Vass | ...................... B64C 39/064 244/12.2 |
| 5,890,441 | A | 4/1999 | Swinson et al. | |
| 6,062,508 | A * | 5/2000 | Black | ..................... B64C 37/00 244/17.11 |
| 6,877,690 | B1 * | 4/2005 | Bragg | ....................... B60F 5/02 244/2 |
| 6,886,776 | B2 | 5/2005 | Wagner et al. | |
| 7,066,426 | B2 * | 6/2006 | Preston | ................... B60F 5/006 244/13 |

(Continued)

*Primary Examiner* — Valentina Xavier

(57) ABSTRACT

An aircraft including a body, a first propeller assembly, a second propeller assembly, a flight control surface, and a parachute. The first propeller assembly is coupled to the body and configured to provide vertical lift. The second propeller assembly is coupled to the body and configured to provide horizontal thrust. The flight control surface is operably coupled to the body. The parachute extends from the body and is arranged to facilitate aircraft takeoff.

20 Claims, 11 Drawing Sheets

(56) References Cited

U.S. PATENT DOCUMENTS

| | | | |
|---|---|---|---|
| 7,267,299 B2 * | 9/2007 | Lamont | B64C 29/0025 |
| | | | 244/12.3 |
| 8,109,802 B2 * | 2/2012 | Chui | A63H 27/12 |
| | | | 446/36 |
| 10,207,799 B2 * | 2/2019 | Ringler | B64C 27/20 |
| 10,214,285 B2 | 2/2019 | McCullough et al. | |
| 10,220,944 B2 | 3/2019 | McCullough et al. | |
| 10,737,794 B2 * | 8/2020 | Lee | B64C 39/02 |
| 2004/0061022 A1 * | 4/2004 | Paul | B64C 39/026 |
| | | | 244/10 |
| 2011/0163198 A1 * | 7/2011 | Leaver | B64C 31/032 |
| | | | 244/12.1 |
| 2013/0206915 A1 * | 8/2013 | Desaulniers | B64C 39/028 |
| | | | 244/165 |
| 2018/0354613 A1 | 12/2018 | Cvrlje | |
| 2019/0009485 A1 | 1/2019 | Smeltzer | |
| 2020/0231269 A1 * | 7/2020 | Woubou | B64D 17/80 |
| 2020/0331601 A1 * | 10/2020 | Sabie | B64C 39/024 |
| 2021/0053672 A1 * | 2/2021 | Villabrille Prades | B64D 35/00 |
| 2021/0061464 A1 * | 3/2021 | Mochida | B64D 17/80 |

* cited by examiner

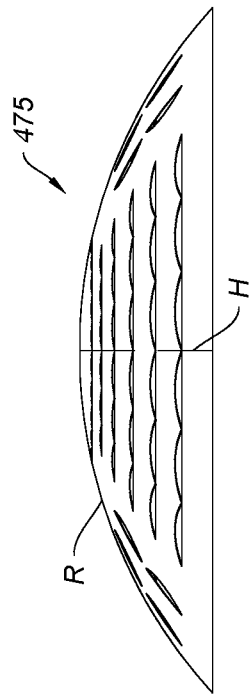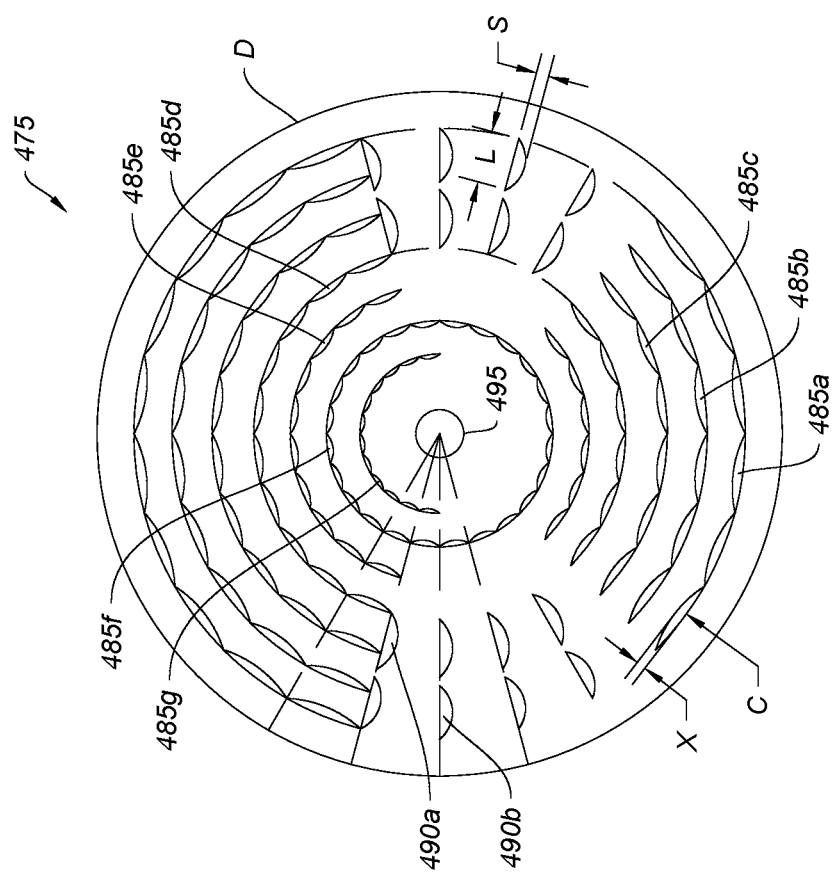

AIRCRAFT WITH VERSATILE AVIATION

FIELD

The present disclosure is generally related to the field of aircrafts, and more particularly to aircraft with propellers, parachute, and/or wings.

BACKGROUND

Aircrafts, such as airplanes, and various helicopters such as vertical takeoff and landing aircraft are used in flight. Recently, these aircrafts, such as drones have become widely used and popular amongst flight enthusiast in recent years. By and large, most aircrafts such as vertical takeoff and landing aircraft include one or more propellers that enable the aircraft to hover, takeoff and land vertically and most airplanes include a fixed-wing and are propelled forward by thrust from a jet engine, propeller, or rocket engine. These aircrafts involve application of various safety mechanisms due to heavy reliance on the propellers and other mechanical portions of the aircraft for flight. Deployable parachutes are commonly used for simplicity and as an inexpensive solution to emergency situations that cause the aircraft to interrupt flight. Such deployable parachutes are typically only used in emergency situations to prevent damage of the aircraft, passengers, and/or payload of the aircraft.

SUMMARY

The techniques of this disclosure generally relate to an aircraft with a parachute to facilitate flight.

In one aspect, the present disclosure provides an aircraft. The aircraft includes a body, a first propeller assembly, a second propeller assembly, a flight control surface operably coupled to the body, and a parachute. The first propeller assembly is coupled to the body and configured to provide vertical lift. The second propeller assembly is coupled to the body and configured to provide horizontal thrust. The parachute extends from the body and is arranged to facilitate aircraft takeoff.

In aspects, the first propeller assembly may include four propellers each coupled to a motor.

In aspects, the second propeller assembly may include two forward facing propellers each coupled to a thruster and a duct disposed on the body.

In aspects, the parachute and the first propeller assembly may be configured to be angled relative to the body of the aircraft.

In aspects, the parachute may be configured to be collapsible.

In aspects, the aircraft may further include a fuselage.

In aspects, the flight control surface may include an elevon.

In aspects, the parachute may define a circular dome shape.

In aspects, the parachute may further define cutouts to facilitate airflow through the parachute.

In aspects, the cutouts of the parachute may include at least one concentric cutout, at least one chord cutout, at least one circular cutout, or combinations thereof.

In aspects, the parachute and the flight control surface may be configured to operate in tandem to limit a wing span size of the flight control surface.

In aspects, the aircraft may further include two modes of flight, the two modes of flight may include a Vertical Take-Off and Landing flight mode and a Fast Forward flight mode.

In aspects, the Vertical Take-Off and Landing flight mode, the first propeller assembly may be enabled to provide lift, while the second propeller assembly and the flight control surface may be disabled.

In aspects, the Fast Forward flight mode, the parachute, the flight control surface, and the second propeller assembly may operate in tandem while the first propeller assembly may be disabled.

In aspects, according to either one of the two flight modes, the aircraft may take off and land vertically or horizontally to and from the ground.

In aspects, the aircraft may be configured to transition between the two flight modes during flight.

In aspects, when one of the first or second propeller assemblies fails, the parachute may enable the aircraft to glide.

In aspects, the fuselage may be configured to enable control of the aircraft in person or remotely.

In another aspect, the present disclosure provides a method of operating an aircraft. The method includes activating at least one of two flight modes. The two flight modes include a first flight mode and a second flight mode. The first flight mode includes a first propeller assembly configured to provide vertical lift. The second flight mode includes a flight control surface and a second propeller assembly configured to provide horizontal thrust. The method also includes enabling the aircraft to take off based on the activated flight mode with the parachute in an expanded position.

In aspects, the method of operating the aircraft includes transitioning the aircraft between the two flight modes. In transitioning, the previously activated flight mode may be disengaged, and the available flight mode may be activated. The method also includes enabling the aircraft to smoothly transition to flight in the newly activated flight mode

BRIEF DESCRIPTION OF THE DRAWINGS

The above and other aspects, features, and advantages of the present disclosure will become more apparent in light of the following detailed description when taken in conjunction with the accompanying drawings, in which:

FIG. 7A is a top view of the parachute of the parachute assembly, illustrating the cutout configuration of the parachute;

FIG. 7B is a side view of the parachute of the parachute assembly;

DETAILED DESCRIPTION

Figure 1:
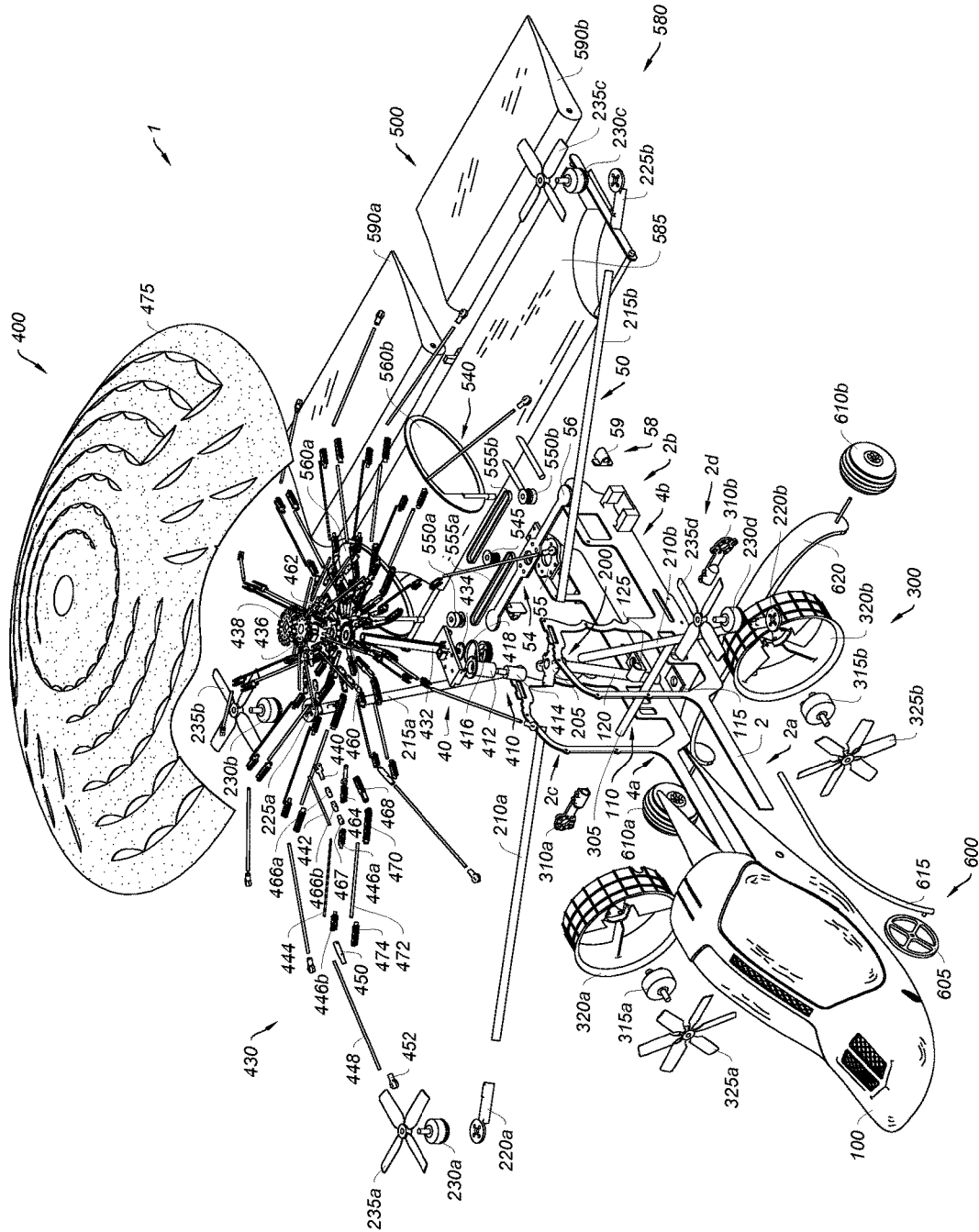
FIG. 1 is an exploded, perspective view of an aircraft including a parachute assembly according to the disclosure.
Figure 2:
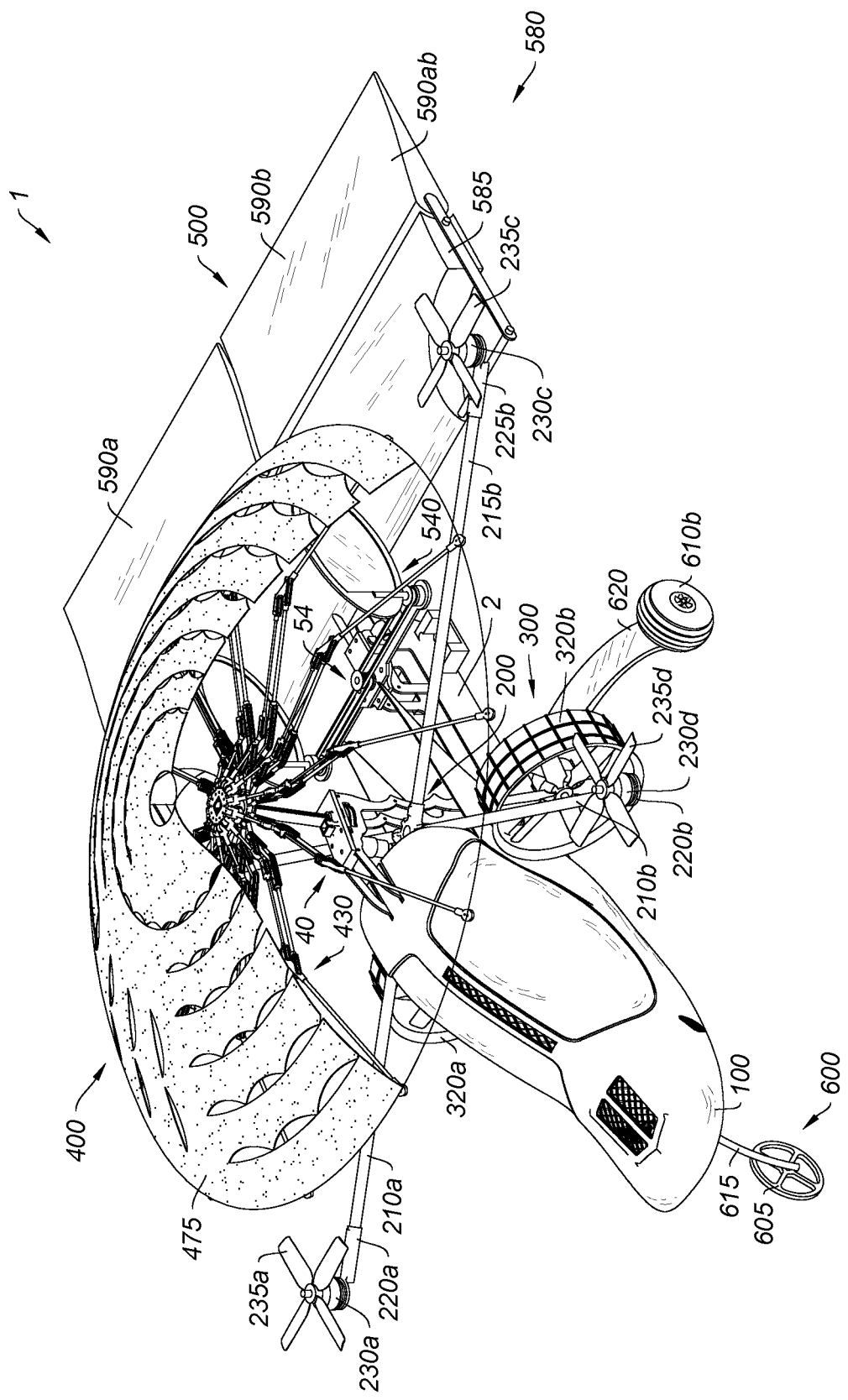
FIG. 2 is a perspective view of the aircraft of FIG. 1.

Particular embodiments of the disclosure are described hereinbelow with reference to the accompanying drawings. In the following description, well-known functions or constructions are not described in detail to avoid obscuring the present disclosure in unnecessary detail.

The following aspects of the aircraft, and in particular, the use of a parachute to facilitate flight providing the aircraft with increased aerodynamics during flight and additional safety. Aspects of the aircraft disclosed herein include structural features that improve lift volume and reduce the need for wider wingspan on the aircraft thereby creating a more compact aircraft.

Although the following disclosure is described with respect to an aircraft, it is understood that the disclosed benefits may be realized by any type of aircraft. In addition, terms such as a "paradrone," and the like may be used simply for convenience of description to describe an aircraft having a parachute to facilitate flight.

With reference to FIG. 1 to FIG. 4, an aircraft 1 generally includes a fuselage 100, a vertical propeller assembly 200, a horizontal propeller assembly 300, a parachute assembly 400 and a flight control surface 500 all of which are configured to mount to a main frame 2 having a front end 2a, a rear end 2b, a top portion 2c, a bottom portion 2d, and two opposing sides 4a, 4b. The main frame 2 generally includes a propeller assembly mount 110, a parachute assembly mount 40, a flight control assembly mount 50, and a landing gear assembly 600. The propeller assembly mount 110 includes a clamp 115 coupled to the bottom portion 2d of the main frame 2 configured for receipt of a tube 120 extending upwards at an angle. The angle of the tube 120 is configured to angle the vertical propeller assembly 200 backwards a predetermined angle 6 relative to the main frame 2 when coupled and a motor mount clamp 125 slidably coupled centrally on the tube 120. The motor mount clamp 125 is configured to support the horizontal propeller assembly 300. The parachute assembly mount 40 is configured for receipt of the parachute assembly 400 coupled to the top portion 2c of the main frame 2 configured to match the predetermined angle 6.

The fuselage 100 is mounted to the front end 2a of the main frame 2. The fuselage 100 may be further configured to control operations of the aircraft 1, hold crew members, passengers, and/or cargo. The landing gear assembly 600 is mounted to the bottom portion 2d of the main frame 2. The landing gear assembly 600 generally includes, a front wheel 605 operably coupled to a front landing gear 615, and a pair of rear wheels 610a, 610b are operably coupled to a rear landing gear 620 having two opposing ends. The front landing gear 615 is coupled centrally to the fuselage 100. Although the landing gear assembly 600 is described herein as a tricycle configuration, it is contemplated that the landing gear assembly 600 may be any configuration suitable for example taxing or horizontal takeoff of the aircraft 1 from the ground, such as taildragger, retractable gear, and/or the like.

The horizontal propeller assembly 300 includes a horizontal motor mount tube 305, a pair of motor mounts 310a, 310b, a pair of forward motors 315a, 315b, a pair of propeller ducts 320a, 320b, and a pair of propellers 325a, 325b. The horizontal motor mount tube 305 extends between the two opposing sides 4a, 4b through the motor mount clamp 125 of the propeller assembly mount 110. Each of the motor mounts 310a, 310b is coupled to the two opposing ends of the horizontal motor mount tube 305. Each of the propeller ducts 320a, 320b is coupled to the motor mounts 310a, 310b via each of the forward motors 315a, and 315b. Each of the propellers 325a, 325b is operably coupled to each of the forward motors 315a, 315b.

The vertical propeller assembly 200 generally includes a main spar tube holder 205, a pair of front quadcopter spar tubes 210a, 210b, a pair of rear quadcopter spar tubes 215a, 215b, a pair of front quadcopter motor mounts 220a, 220b, a pair of rear quadcopter motor mounts 225a, 225b, a set quadcopter motors 230a, 230b, 230c, 230d, and a set quadcopter propellers 235a, 235b, 235c, 235d. The main spar tube holder 205 is mounted to the tube 120 at the end opposite the clamp 115. The pair of front quadcopter spar tubes 210a and 210b are coupled to the front end of the main spar tube holder 205 and the pair of rear quadcopter spar tubes 215a and 215b are coupled to the rear end of the main spar tube holder 205. The pair of front quadcopter spar tubes 210a, 210b, the main spar tube holder 205, and the pair of rear quadcopter spar tubes 215a, 215b forms the predetermined angle 6 relative to the main frame 2. The pair of front quadcopter motor mounts 220a, 220b are coupled to the front end of the pair of front quadcopter spar tubes 210a, 210b, and the pair of rear quadcopter motor mounts 225a, 225b are coupled to the rear end of the pair of rear quadcopter spar tubes 215a, 215b. Quadcopter motors 230a, 230b are mounted to the front quadcopter motor mounts 220a, 220b, and quadcopter motors 230c, 230d are mounted to the rear quadcopter motor mounts 225a, 225b. Each quadcopter propellers 235a, 235b, 235c, 235d is operably coupled to each of the quadcopter motors 230a, 230b, 230c, 230d.

The flight control surface 500 is mounted to the flight control assembly mount 50 and generally includes a rudder assembly 540 and a tail assembly 580. The rudder assembly 540 and tail assembly 580 are mounted to the flight control assembly mount 50. The flight control assembly mount 50 further includes a rudder mount assembly 54 and a tail mount assembly 58. The rudder mount assembly 54 of the flight control assembly mount 50 generally includes a rudder base mount 55 and a rudder mount 56. The rudder mount 56 of the rudder mount assembly 54 is coupled to the top of the rudder base mount 55 of the rudder mount assembly 54 and the rudder base mount 55 of the rudder mount assembly 54 is configured to be mounted to the rear end 2b of the main frame 2. The tail mount assembly 58 of the flight control assembly mount 50 generally includes a tail tube clamp 59 configured to be coupled to the two opposing sides 4a, 4b of the rear end 2b of the main frame 2 configured for receipt of the flight control surface 500.

The rudder assembly 540 is mounted to the rudder mount assembly 54 of the flight control assembly mount 50. The rudder assembly 540 generally includes a rudder drive pulley 545 configured to couple to a pair of rudder timing pulleys 550a and 550b via a pair of timing belts 555a and 555b, and a pair of rudders 560a and 560b. Timing belt 555a is configured to operably couple the rudder timing pulley 550a and the rudder drive pulley 545. Timing belt 555b is configured to operably couple the rudder timing pulley 550b and the rudder drive pulley 545. The pair of rudder timing pulleys 550a and 550b are configured to allow for receipt of the pair of rudders 560a and 560b. Each of the rudders 560a and 560b are inserted into the top opening of the rudder timing pulleys 550a and 550b.

The tail assembly 580 is mounted to the tail mount assembly 58 of the flight control assembly mount 50. The tail assembly 580 generally includes a horizontal wing 585, and a pair of elevons 590a and 590b. The horizontal wing 585 further includes elevon mounting brackets disposed on the rear end portion of the horizontal wing 585, and two mounting tubes disposed on the front end portion of the horizontal wing 585 configured to be inserted in the tail tube clamp 59 of the tail mount assembly 58. Elevon 590a and 590b are hingedly coupled to the elevon mounting brackets disposed on the rear end portion of the horizontal wing 585.

Figure 3:
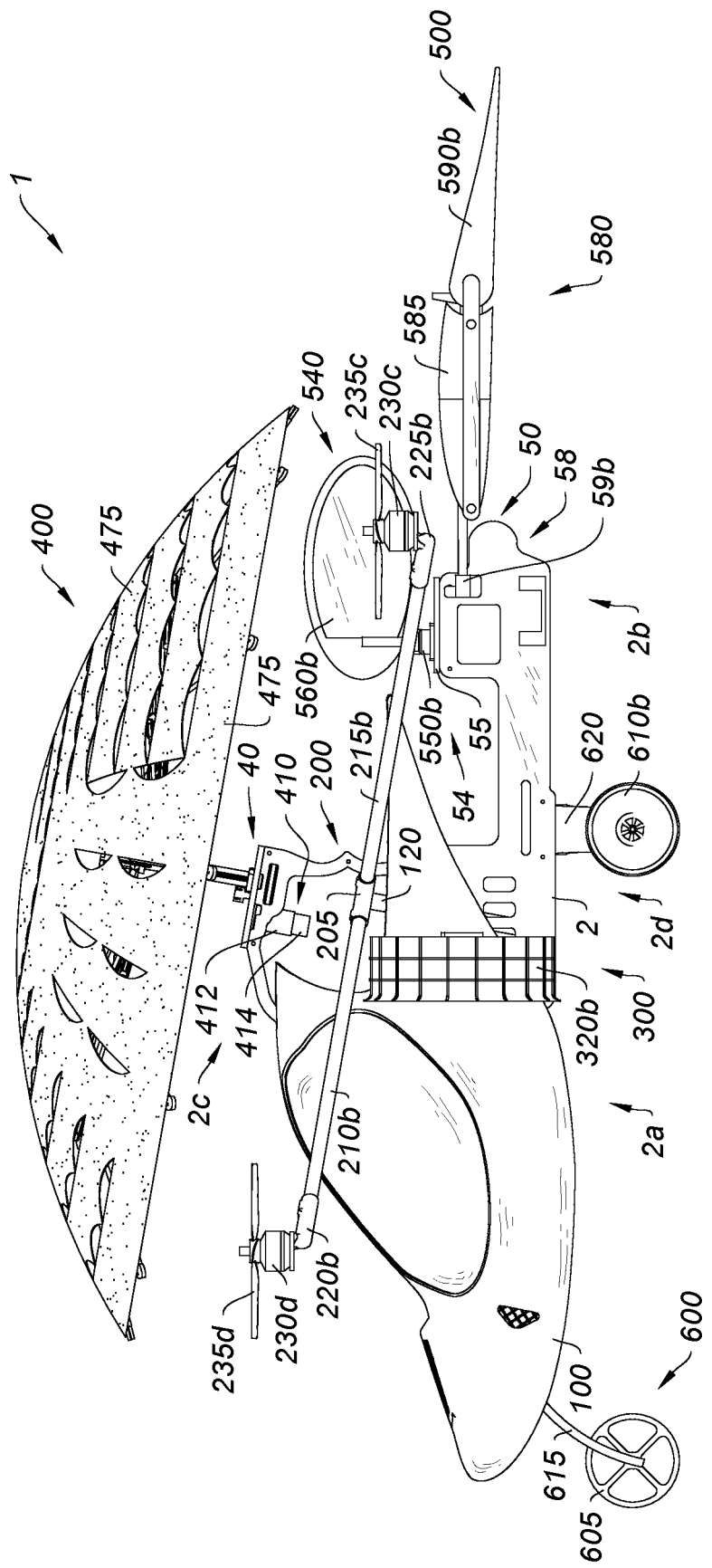
FIG. 3 is a side view, of the aircraft of FIG. 1.
Figure 4:
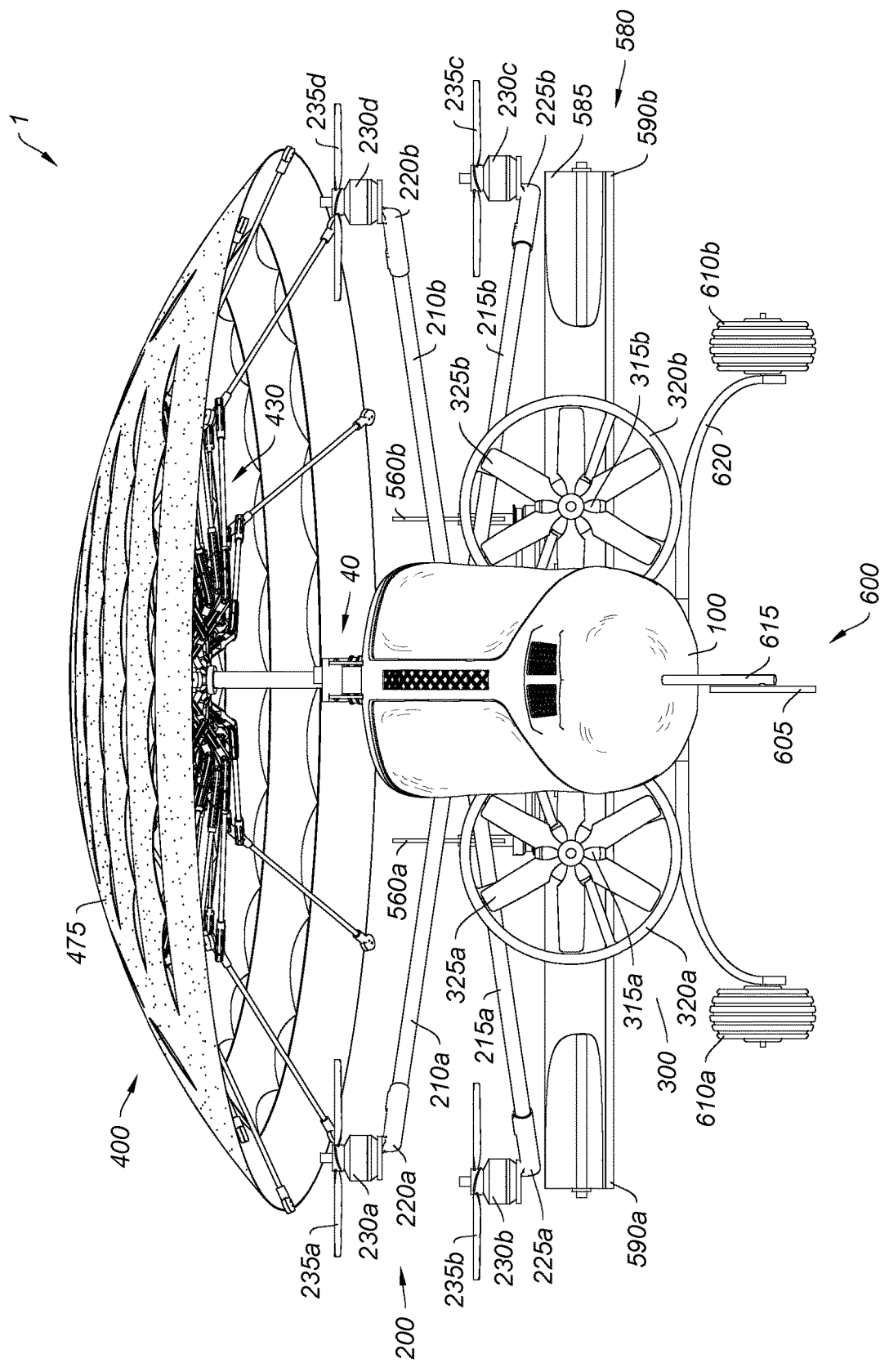
FIG. 4 is a front view, of the aircraft of FIG. 1.
Figure 5:
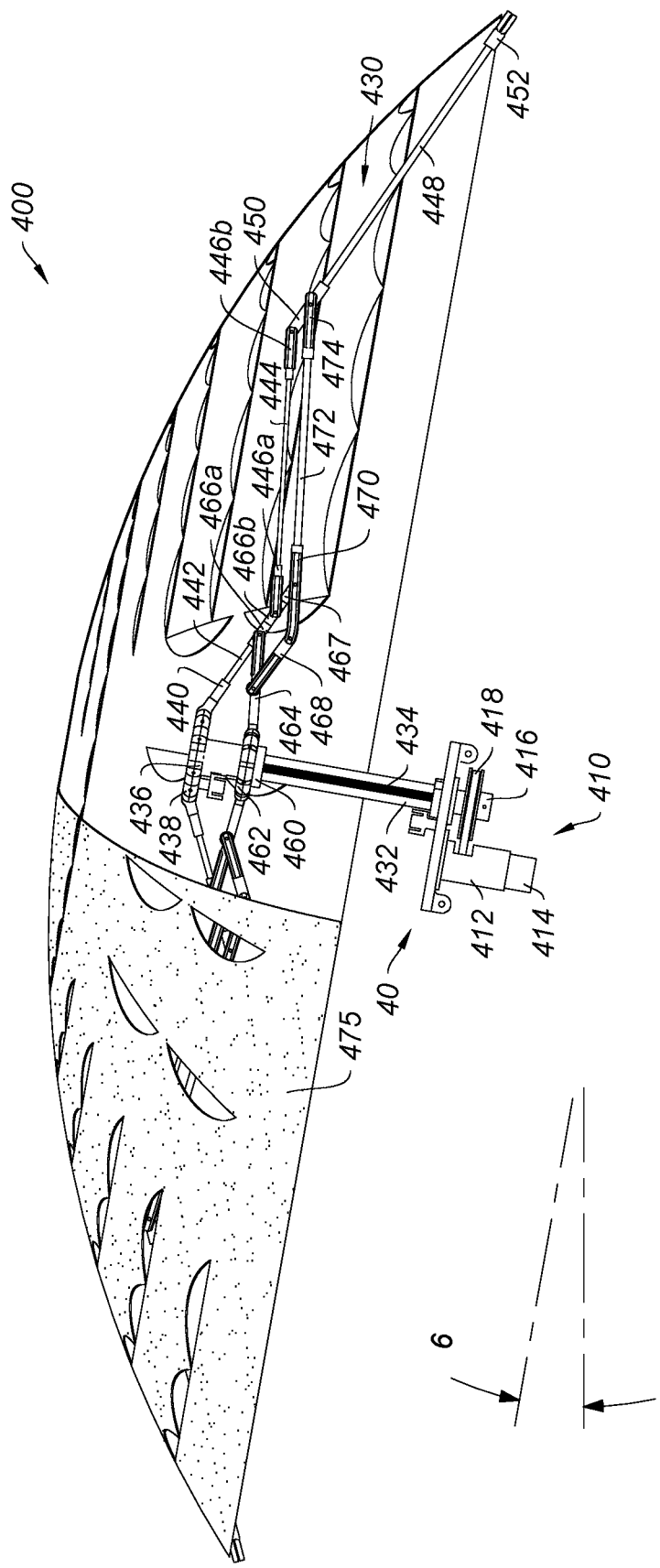
FIG. 5 is an enlarged side view of the parachute assembly of the aircraft of FIG. 1 having a parachute, illustrating the parachute assembly opened.
Figure 6:
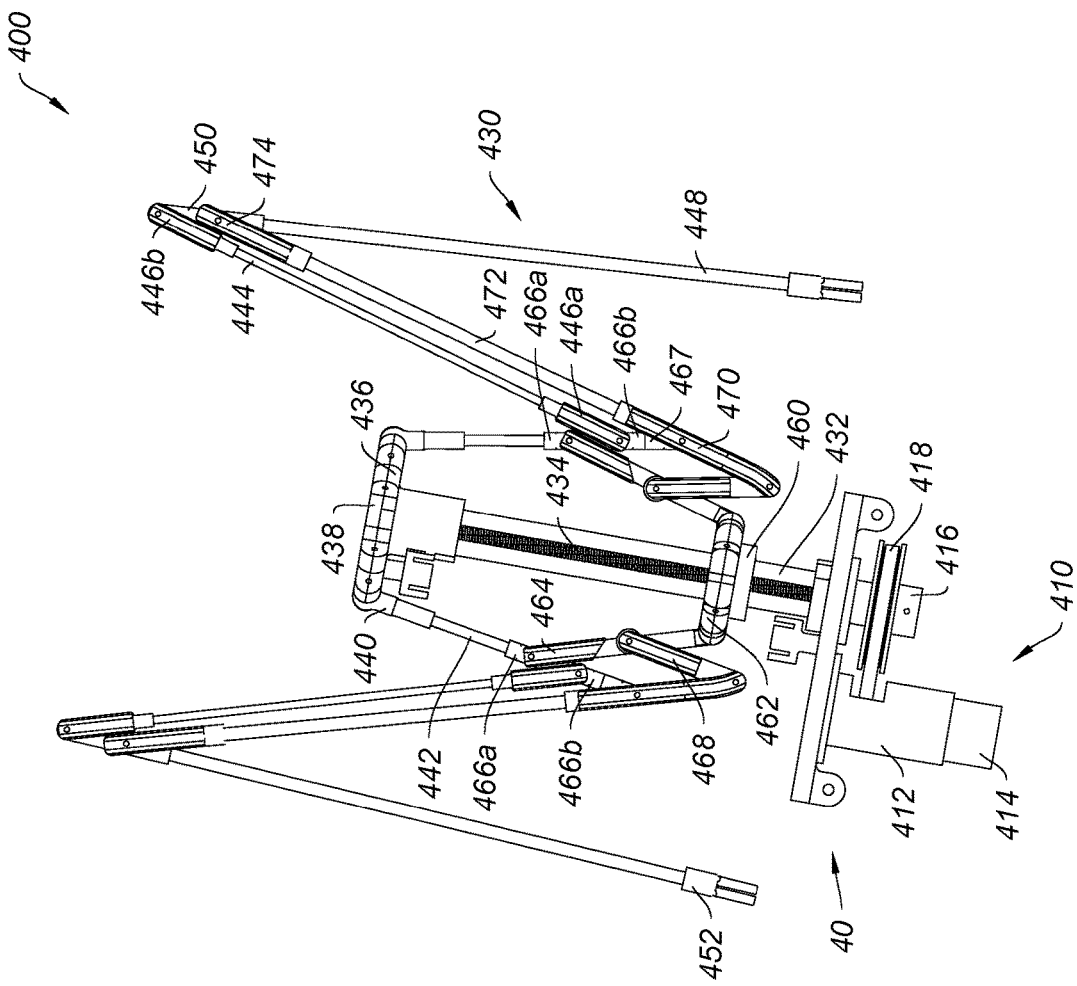
FIG. 6 is an enlarged side view of the parachute assembly of the aircraft of FIG. 1, illustrating the parachute assembly closed without the parachute.

FIG. 1, FIG. 3, and FIG. 5 illustrate the parachute assembly 400 mounted to the parachute assembly mount 40 forming the predetermined angle 6 relative to the main frame 2. The parachute assembly 400 generally includes a parachute motor assembly 410, a parachute frame 430, and a parachute 475. The parachute 475 is coupled to the parachute frame 430, and configured to be controlled by the parachute motor assembly 410. The parachute motor assembly 410 is coupled to the bottom portion of the parachute assembly mount 40. The parachute motor assembly 410 generally includes a motor clamp 412, a motor 414, a motor timing pulley 416, and a motor timing belt 418. The motor 414 is coupled to the motor clamp 412 and the motor timing pulley 416 is coupled to the motor timing belt 418. The motor clamp 412 is configured to be in communication with the motor timing belt 418.

The parachute frame 430 is coupled to the parachute assembly mount 40 via a slide rail 432 and operably secured by a spider jack screw 434 threaded through a channel of the slide rail 432 in communication with the motor timing pulley 416. The parachute frame 430 generally includes a sliding spider arm 460, and a stationary spider arm 436. The sliding spider arm 460 is configured to move axially along the slide rail 432 based on actuation of the motor timing pulley 416.

The stationary spider arm 436 of the parachute frame 430 further includes a link joint 438 configured for receipt of at least one or more pivot link arms 440. Each of the pivot link arms 440 are configured to couple to a first rod 442. The opposite end of the first rod 442 is configured to couple to a second rod 444 via a first pivot link 446a coupled to a second end of the joiner link 466b. The first pivot link 446a is disposed at one end of the second rod 444 and a second pivot link 446b is disposed at the opposite end of the second rod 444. The second pivot link 446b is configured to couple to a third rod 448 via a swing rod arm 450. The third rod 448 is configured to have a parachute clamp 452 disposed at the opposite end of the third rod 448 coupled to the swing rod arm 450.

The sliding spider arm 460 of the parachute frame 430 further includes a second link joint 462 configured for receipt of at least one or more pivot arm links 464. Each of the pivot arm links 464 is configured to couple to the first rod 442 via a first end of a joiner link 466a. Each of the pivot arm links 464 further includes a connecting joint 468 coupled centrally to each of the pivot arm links 464 and the opposite end of the connecting joint 468 is coupled to a pivot arm 470 configured for receipt of a fourth rod 472. The opposite end of the fourth rod 472 is coupled to the swing rod arm 450 via a rod pivot joint 474.

FIG. 7A and FIG. 7B illustrates the parachute 475 of the parachute assembly 400 having a predetermined radius R, a predetermined diameter D, and a predetermined height H. The combination of the radius R, the diameter D, and the height H without cutouts is configured to have a volume V. The parachute 475 is configured to be a circular dome shape creating a high volume V resulting in a reduction in diameter D of the parachute 475 and the wingspan of the flight control surface 500 thus making the aircraft 1 optimal for a personal size vehicle. Volume V of the parachute 475 may further be reduced by a volume reduction value percentage 480 to provide optimal lift by including one or more concentric cutouts 485, one or more chord cutouts 490, and a circular cutout 495.

The one or more concentric cutouts 485 further includes concentric cutouts that vary in height and radius of concentric arcs, such as for example, 485a, 485b, 485c, 485d, 485e, 485f, and 485g used to reduce the volume V by the volume reduction value percentage 480. The one or more concentric cutouts 485 varying in height and radius of concentric arcs are disposed around the perimeter of the parachute 475. With each change in the height and radius of concentric arcs of the concentric cutouts 485, the concentric cutouts 485 are disposed around the perimeter of the parachute 475 closer to the center of the parachute 475. The one or more chord cutouts 490 further includes chord cutouts that vary in length, such as for example, 490a, and 490b used to reduce the volume V by the volume reduction value percentage 480. The one or more chord cutouts 490 are disposed perpendicular to the concentric cutouts 485 on the parachute 475. The circular cutout 495 is disposed centrally on the parachute 475 and configured to have a predetermined diameter, such as for example, 495a used to reduce the volume V by the volume reduction value percentage 480. Due to the circular dome shape of the parachute 475, the reduced diameter D, and the volume V reduced by volume reduction value percentage 480 creates a gliding characteristic ideal for gliding and emergency landing of the aircraft 1 in the event of an engine or motor failure.

The parachute assembly 400 is configured to collapse when not in flight, enabling storage when taxing on the ground and parking, but the parachute assembly 400 is expanded prior to flight of the aircraft 1. In collapsing and expanding the parachute assembly 400, the motor 414 in communication with the motor timing pulley 416 moving in a first direction causes the spider jack screw 434 to translate linear movement of the sliding spider arm 46 in upward direction, expanding the parachute assembly 400, and in the reverse the motor 414 moving in a second direction, opposite of the first direction, causes the spider jack screw 434 to translate linear movement of the sliding spider arm 46 in a downward direction, collapsing the parachute assembly 400. Although the parachute assembly 400 is described herein as a single round parachute, it is contemplated that the parachute assembly 400 may have any number of parachutes in a round or non-round configuration suitable, for example, enabling flight of the aircraft.

Figure 8:
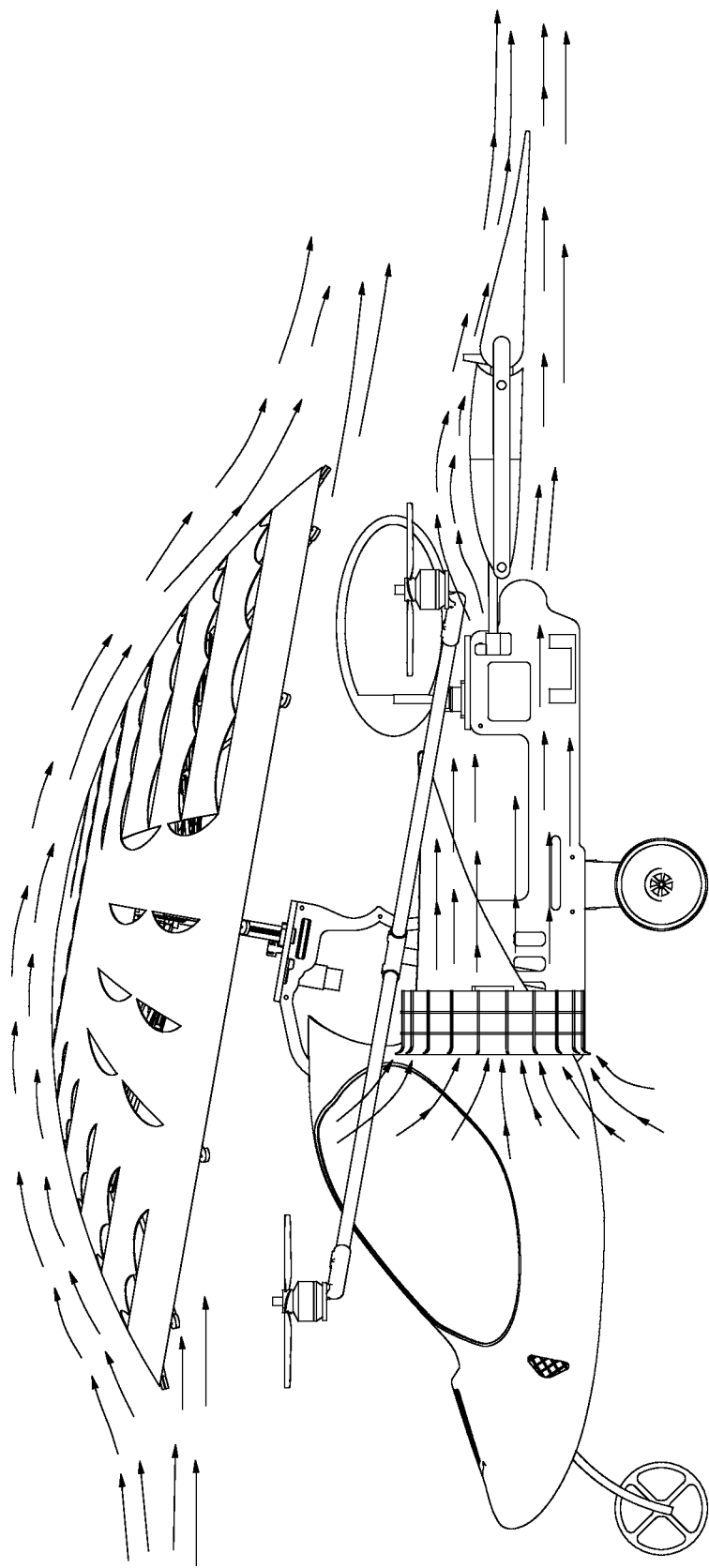
FIG. 8 is a side view of the aircraft of FIG. 1, illustrating airflow around the aircraft in a Fast Forward Flight Mode.
Figure 9:
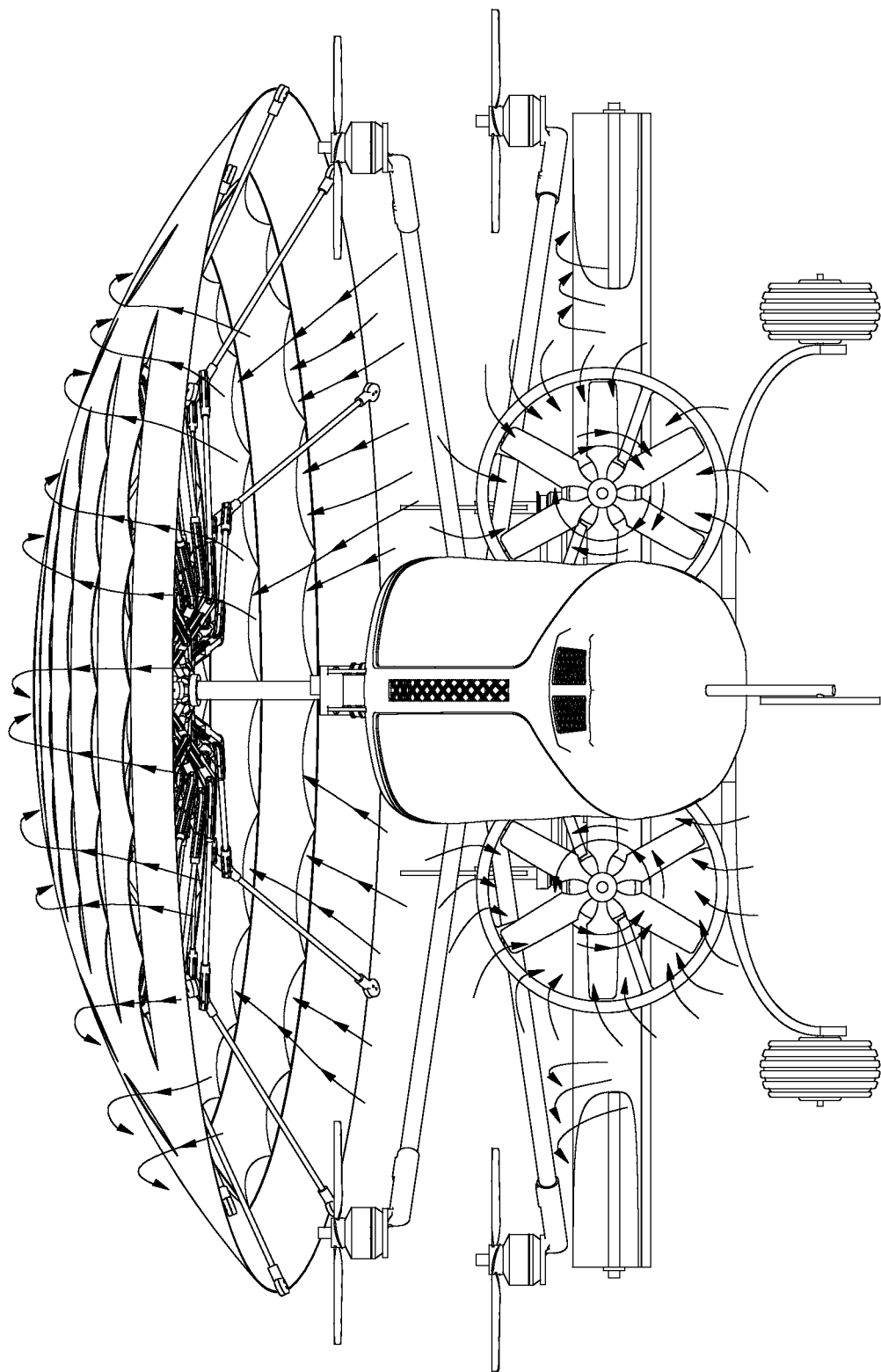
FIG. 9 is a front view of the aircraft of FIG. 1, illustrating airflow around the aircraft in the Fast Forward Flight Mode.

In operation, the aircraft 1 is configured to have two modes of flight operation which includes a Vertical Take-Off and Landing (VTOL) flight mode and a Fast Forward Flight mode. FIG. 8 and FIG. 9 illustrate the Fast Forward Flight mode of the aircraft 1. In Fast Forward flight mode the parachute assembly 400, the flight control surface 500 and the horizontal propeller assembly 300 operate in tandem to perform fast forward flight. During the Fast Forward flight mode of the aircraft 1, the vertical propeller assembly 200 is disabled while the horizontal propeller assembly 300 is enabled. Air flow across the aircraft 1 during Fast Forward flight mode when in forward motion causes air to flow under the parachute assembly 400 and over the parachute assembly 400 towards the rear end of the aircraft 1 thus creating low pressure enabling lift. Lift due to low pressure is created by the one or more concentric cutouts 485, the one or more chord cutouts 490, and the circular cutout 495 of the parachute 475. Some drag is created by the parachute 475, which helps in forcing the air flow under the parachute assembly 400 to inflate the parachute 475 as the aircraft 1 moves through the air. Additionally, during flight of the aircraft 1 in the Fast Forward flight mode air flows through the pair of propellers 325a, 325b and the propeller duct 320a, 320b towards the rear end of the aircraft 1 where air flows through the rudders 560a, 560b and over and under the flight control surface 500 creating high and low pressure to produce lift. The combination of the lift created by the parachute assembly 400 and the flight control surface 500, a balance is created enabling forward thrust to overcome the weight of the aircraft 1.

Lateral stability of the aircraft 1, during Fast Forward flight mode, is achieved due to the circular surface of the parachute 475 and by utilizing rudders 560a and 560b as air flow is forced rearward from the horizontal propeller assembly 300 to the rudders 560a and 560b thus countering unwanted yaw. The combination of the horizontal propeller assembly 300 and rudders 560a and 560b creates a differential thrust whereby gyro stabilization locks up the lateral stability of the aircraft 1 enabling left and right turning about the axis.

When in Fast Forward flight mode, the flight control surface 500 operates similar to that of a standard airplane. The elevon 590a and 590b are configured to combine the functions of an elevator for pitch control and aileron for roll control. The elevon 590a and 590b provides control for the aircraft 1 and allows aircraft 1 to climb, dive, bank left or right, or to turn left or right.

Figure 10:
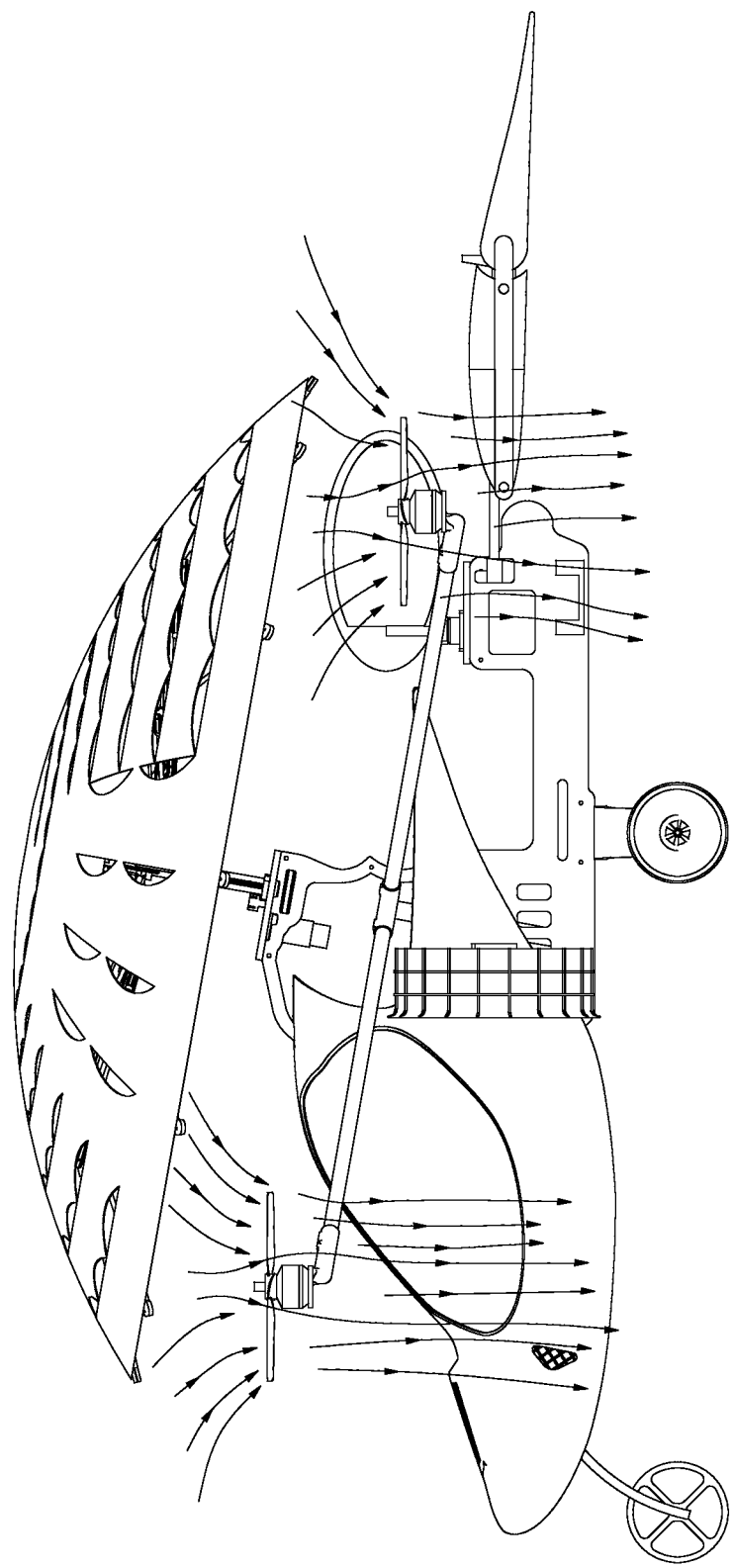
FIG. 10 is a side view of the aircraft of FIG. 1, illustrating airflow around the aircraft in a Vertical Take-off Landing Flight Mode.
Figure 11:
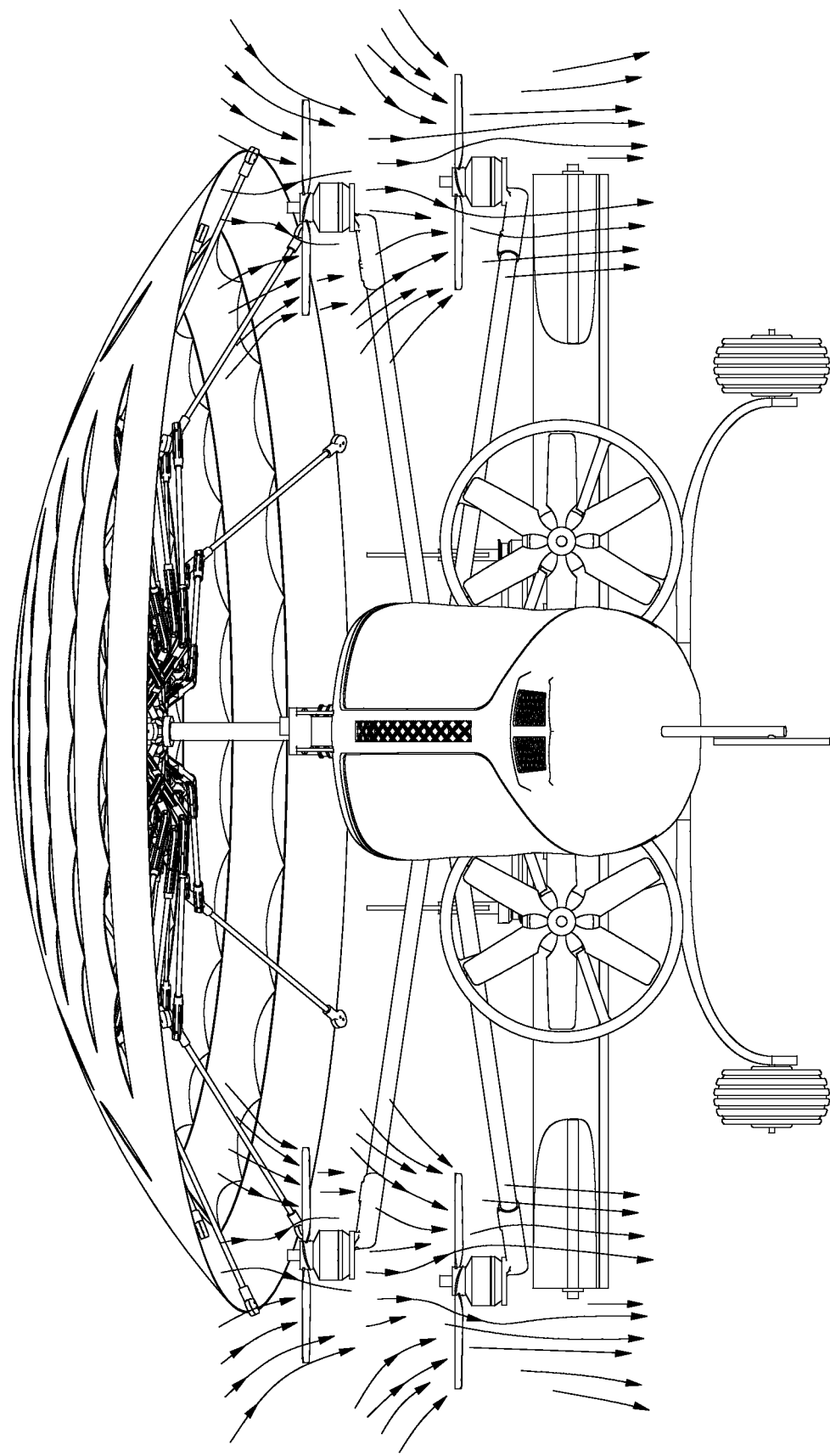
FIG. 11 is a front view of the aircraft of FIG. 1, illustrating airflow around the aircraft in the Vertical Take-off Landing Flight Mode.

FIG. 10 and FIG. 11 illustrate the VTOL flight mode of the aircraft 1. In VTOL flight mode the parachute assembly 400 does not hinder operation of the vertical propeller assembly 200. During the VTOL flight mode of the aircraft 1, the vertical propeller assembly 200 is enabled while the horizontal propeller assembly 300 is disabled. Air flow across the aircraft 1 during VTOL flight mode when in flight causes air to flow through the parachute 475 downwardly through the quadcopter propellers 235a, 235b, 235c, 235d towards the ground. When in VTOL flight mode, the aircraft 1 operates similar to that of a standard drone. The vertical propeller assembly 200, as in standard drones, provides lift and control of the aircraft 1, thus enabling hovering, slow forward, backwards and sideways movement, and yaw about an axis.

With reference to FIG. 8 to FIG. 11, the aircraft 1 can take off and land vertically in VTOL flight mode or horizontally in Fast Forward flight mode to and from the ground. The aircraft 1 when in flight is capable of transitioning between both flight modes VTOL flight mode and Fast Forward flight mode.

During flight when the aircraft 1 is in VTOL flight mode, to transition to Fast Forward flight mode, Fast Forward flight mode is activated. When Fast Forward flight mode is activated, the vertical propeller assembly 200 is disabled while the horizontal propeller assembly 300 and the flight control surface 500 are enabled. Thus, the full operation of the Fast Forward flight mode is available. During flight when the aircraft 1 is in Fast Forward flight mode, to transition to VTOL flight mode, VTOL flight mode is activated. When VTOL flight mode is activated, the horizontal propeller assembly 300 and the flight control surface 500 are disabled while the vertical propeller assembly 200 is enabled. Thus, the full operation of the VTOL flight mode is available. Transitioning between VTOL flight mode and Fast Forward flight mode provides efficient flight control in various conditions including safety when landing.

In various embodiments, the disclosed aircraft 1 can be implemented as a radio controlled model aircraft, multi-passenger car-sized vehicle, or any personal size drone. For example, the aircraft 1 implemented as a radio controlled model, the parachute assembly 400 provides for scaled down measurements. For example, the aircraft 1 weighting about 3.5 pound coupled to the horizontal propeller assembly 300 generating about 1700 grams of thrust at 850 watts of power. The radius R of the parachute 475 is about 15.869", the diameter D of the parachute 475 is about 21.400", and the height H of the parachute 475 is about 4.123" generating a volume without holes of about 778.60 in$^3$.

With reference to FIGS. 7A and 7B, in order to reduce volume by a volume reduction value percentage 30%, the concentric cutout 485a, 485b, 485c, 485d, 485e, 485f, and 485g, has a starting height of about 0.300" and a radius of about 9.545" and reduces to a ending height of about 0.125" and radius of about 2.490", with each concentric cutout 485. Additionally, the circular cutout 495 has a diameter of about 1.5" and the chord cutouts 490a and 490b are about 0.400" in height and 1.670" and 1.811" in length, respectively.

With the reduced volume and exemplary measurements of the aircraft 1, in Forward Flight mode, the airflow through the parachute 475 with the exemplary cutout measurements and dimensions which reduced the volume efficiently enables lift of an aircraft 1 weighting about 3.5 pound. The flight control surface 500 working in tandem with the parachute assembly 400 during Fast Forward flight mode moves air from the pair of propellers 325a, 325b to the flight control surface 500 producing lift and enabling balance about the center of gravity of the aircraft 1.

While various embodiments are contemplated above, many variations are possible. In particular, the above aircraft may be implemented as an unmanned or manned aircraft. With respect to the unmanned aircraft additional features may be employed, such as, for example flight controller, processors, power supplies, and communication devices. Examples of unmanned aircrafts are described in U.S. Pat. No. 10,214,285, U.S. Patent Applications Publication No. 2018/0354613, and U.S. Patent Applications Publication No. 2019/009485 which are hereby incorporated by reference herein in its entirety.

With respect to the manned aircraft additional features may be employed, such as, for example engines, exhaust, steering, and controls. Examples of manned aircraft are described in U.S. Pat. No. 6,886,776 and U.S. Pat. No. 10,220,944 which are hereby incorporated by reference herein in its entirety. Alternatively, the aircraft may be both an unmanned and manned aircraft, such as, for example as described in U.S. Pat. No. 5,890,441 which is hereby incorporated by reference herein in its entirety.

Any or all portions of any of the aircraft from the parachute to the wing disclosed herein may be structured in any suitable manner, e.g., varying the number of propellers, material and design, including the use of any materials, and manufacturing techniques, not specifically described. From the foregoing and with reference to the various figures, those skilled in the art will appreciate that certain modifications can also be made to the present disclosure without departing from the scope of the same.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. An aircraft comprising:
    a body;
    a first propeller assembly coupled to the body and configured to provide vertical lift;
    a second propeller assembly coupled to the body and configured to provide horizontal thrust;
    a flight control surface operably coupled to the body; and
    a parachute extending from the body, the parachute defining an array of cutouts disposed in spaced-apart relation about the parachute, wherein each cutout is positioned to generate lift.

2. An aircraft comprising:
    a body;
    a first propeller assembly coupled to the body and configured to provide vertical lift, the first propeller assembly including four propellers, each propeller coupled to a motor;
    a second propeller assembly coupled to the body and configured to provide horizontal thrust:
    a flight control surface operably coupled to the body; and
    a parachute extending from the body and arranged to facilitate aircraft takeoff.

3. The aircraft of claim 1, wherein the second propeller assembly includes two forward facing propellers each coupled to a thruster and a duct disposed on the body.

4. The aircraft of claim 1, wherein the parachute and the first propeller assembly are configured to be angled relative to the body.

5. The aircraft of claim 1, wherein the parachute is configured to be collapsible.

6. The aircraft of claim 1, wherein the flight control surface includes an elevon.

7. The aircraft of claim 1, wherein the parachute defines a circular dome shape.

8. The aircraft of claim 1, wherein the cutouts are separate and distinct from one another and arranged to facilitate simultaneous airflow streams through the parachute at different and spaced-apart locations about the parachute.

9. The aircraft of claim 8, wherein at least one of the cutouts is radially spaced from a center of the parachute.

10. The aircraft of claim 1, wherein the parachute and the flight control surface are configured to operate in tandem to limit a wing span size of the flight control surface.

11. The aircraft of claim 1, further comprising two modes of flight, the two modes of flight including a Vertical Take-Off and Landing flight mode and a Fast Forward flight mode.

12. The aircraft of claim 11, wherein in the Vertical Take-Off and Landing flight mode, the first propeller assembly is enabled to provide lift, while the second propeller assembly and the flight control surface are disabled.

13. The aircraft of claim 11, wherein in the Fast Forward flight mode, the parachute, the flight control surface, and the second propeller assembly operate in tandem while the first propeller assembly is disabled.

14. The aircraft of claim 11, wherein according to either one of the two flight modes, the aircraft can take off and land vertically or horizontally to and from the ground.

15. The aircraft of claim 11, wherein the aircraft is configured to transition between the two flight modes during flight.

16. The aircraft of claim 1, wherein when one of the first or second propeller assemblies fails, the parachute enables the aircraft to glide.

17. The aircraft of claim 1, wherein a fuselage is configured to enable control of the aircraft in person or remotely.

18. A method of operating an aircraft having a parachute that is movable between an expanded position and a collapsed position, the method comprising:
    activating at least one of two flight modes, wherein the two flight modes include a first flight mode and a second flight mode,
    wherein in the first flight mode, a first propeller assembly is configured to provide vertical lift, and
    wherein in the second flight mode, a flight control surface and a second propeller assembly are configured to provide horizontal thrust; and
    enabling the aircraft to take off based on the activated flight mode with the collapsible parachute in the expanded position.

19. The method according to claim 18, further comprising transitioning the aircraft between the two flight modes, wherein the previously activated flight mode is disengaged, and the available flight mode is activated; and enabling the aircraft to smoothly transition to flight in the newly activated flight mode.

20. The method according to claim 18, further comprising generating lift with an array of cutouts defined in the parachute as air flows through the cutouts.

* * * * *